United States Patent
Taguchi et al.

(10) Patent No.: US 9,933,795 B2
(45) Date of Patent: Apr. 3, 2018

(54) COOLER

(71) Applicant: Toyota Jidosha Kabushiki Kaisha, Toyota-shi, Aichi-ken (JP)

(72) Inventors: Etsushi Taguchi, Kasugai (JP); Natsuki Nozawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 200 days.

(21) Appl. No.: 14/736,722

(22) Filed: Jun. 11, 2015

(65) Prior Publication Data

US 2015/0369532 A1    Dec. 24, 2015

(30) Foreign Application Priority Data

Jun. 20, 2014  (JP) ................................. 2014-127422

(51) Int. Cl.
*F25D 29/00* (2006.01)
*F25D 11/00* (2006.01)
*G05D 23/19* (2006.01)

(52) U.S. Cl.
CPC ............................... *G05D 23/1917* (2013.01)

(58) Field of Classification Search
CPC ..... G05D 23/1917; G05D 23/19; F01P 11/16; F01P 2025/32; F01P 7/167; F01P 2031/00; G05B 15/02; H01J 37/32522; H01J 37/32724; H01J 37/32908
See application file for complete search history.

(56) References Cited

U.S. PATENT DOCUMENTS

| | | | | |
|---|---|---|---|---|
| 4,673,031 A | * | 6/1987 | Wiemer | G05D 23/1906 165/299 |
| 5,619,957 A | * | 4/1997 | Michels | F01P 7/048 123/41.12 |
| 5,724,924 A | * | 3/1998 | Michels | F01P 7/044 123/41.12 |
| 5,910,099 A | * | 6/1999 | Jordan, Jr. | F01P 7/165 123/41.29 |

(Continued)

FOREIGN PATENT DOCUMENTS

CN    102239394 A    11/2011
JP    2010-216386 A    9/2010

(Continued)

*Primary Examiner* — David Teitelbaum
*Assistant Examiner* — Melodee Jefferson
(74) *Attorney, Agent, or Firm* — Dinsmore & Shohl LLP (57) ABSTRACT

A cooler includes an estimator. The estimator is configured to estimate a coolant temperature from a measurement value of the temperature sensor. The estimator is configured to determine a difference by subtracting an immediately preceding measurement value from a current measurement value, determine a correction value from the difference, and output an estimated value of the coolant temperature. The estimated value is obtained by adding the correction value to the current measurement value. The correction value is obtained by multiplying a gain by the difference. The gain is determined from a time constant, the gain is determined according to a flow rate of the coolant. The time constant is obtained when a transfer function of heat transferred from the coolant to the temperature sensor is modeled as a first order lag system.

2 Claims, 9 Drawing Sheets

(56) References Cited

U.S. PATENT DOCUMENTS

| | | | | |
|---|---|---|---|---|
| 6,622,548 B1* | 9/2003 | Hernandez | | F02D 41/1447 73/114.31 |
| 8,997,847 B2* | 4/2015 | Schwartz | | F01P 7/042 165/244 |
| 2002/0016656 A1* | 2/2002 | Chung | | F01P 7/048 701/36 |
| 2002/0111734 A1* | 8/2002 | Wakahara | | F01P 11/16 701/114 |
| 2003/0074117 A1* | 4/2003 | Oki | | F01P 11/14 701/33.9 |
| 2003/0150406 A1* | 8/2003 | Takagi | | F01P 7/167 123/41.1 |
| 2004/0181333 A1* | 9/2004 | Tsukamoto | | F01P 11/16 701/114 |
| 2005/0074048 A1* | 4/2005 | Wu | | G01K 17/20 374/4 |
| 2006/0157576 A1* | 7/2006 | Eisenhour | | B60H 1/00735 237/28 |
| 2007/0175414 A1* | 8/2007 | Miyahara | | F01P 11/16 123/41.1 |
| 2008/0043887 A1* | 2/2008 | Simmons | | H03D 7/00 375/345 |
| 2009/0236072 A1* | 9/2009 | Mimura | | G05D 23/19 165/11.1 |
| 2011/0120216 A1* | 5/2011 | Sugimoto | | F01P 7/164 73/114.68 |
| 2011/0238351 A1* | 9/2011 | Djelassi | | G01K 13/02 702/99 |
| 2012/0024270 A1* | 2/2012 | Wang | | F02D 41/0007 123/568.21 |
| 2012/0048467 A1* | 3/2012 | Mahadeswaraswamy | | H01J 37/32522 156/345.27 |
| 2012/0085157 A1* | 4/2012 | Nishigaki | | G01M 15/042 73/114.68 |
| 2012/0106590 A1* | 5/2012 | Suzuki | | F01P 7/165 374/1 |
| 2012/0111956 A1* | 5/2012 | Kinomura | | F01P 7/167 236/93 R |
| 2012/0283849 A1* | 11/2012 | Kureemun | | G01K 7/42 700/30 |
| 2012/0291754 A1* | 11/2012 | Yamaguchi | | F02D 41/2464 123/458 |
| 2013/0056194 A1* | 3/2013 | Cregut | | B60K 11/02 165/300 |
| 2013/0158937 A1* | 6/2013 | Howe | | G01K 7/42 702/130 |
| 2013/0213600 A1* | 8/2013 | Saitoh | | F01P 7/165 165/11.1 |
| 2013/0238258 A1* | 9/2013 | Matsuo | | F25B 41/04 702/45 |
| 2014/0023107 A1* | 1/2014 | Furuta | | G01N 25/72 374/4 |
| 2014/0123966 A1* | 5/2014 | Ide | | F02D 21/08 123/568.21 |
| 2015/0206776 A1* | 7/2015 | Mimura | | H01L 21/67248 62/3.7 |

FOREIGN PATENT DOCUMENTS

| | | | |
|---|---|---|---|
| JP | 2010216386 A | * | 9/2010 |
| JP | 2011-172406 A | | 9/2011 |
| JP | 2012-052504 A | | 3/2012 |
| JP | 2012052504 A | * | 3/2012 |

* cited by examiner

| PUMP FLOW RATE (L/min) | TIME CONSTANT (sec) | GAIN |
|---|---|---|
| 1.6 | 55.0 | 5500.0 |
| 3.0 | 48.5 | 4850.0 |
| 3.2 | 48.0 | 4800.0 |
| 7.3 | 43.5 | 4350.0 |
| 10.2 | 41.0 | 4100.0 |
| 11.0 | 40.0 | 4000.0 |

COOLER

INCORPORATION BY REFERENCE

The disclosure of Japanese Patent Application No. 2014-127422, filed on Jun. 20, 2014 including the specification, drawings and abstract, is incorporated herein by reference in its entirety.

BACKGROUND OF THE INVENTION

1. Field of the Invention

The invention relates to a cooler that uses a liquid coolant.

2. Description of Related Art

In a cooler that uses a liquid coolant, a temperature of the coolant may be used to control the cooler (for example, Japanese Patent Application Publication No. 2011-172406 (JP 2011-172406 A) and Japanese Patent Application Publication No. 2012-52504 (JP 2012-52504 A). JP 2011-172406 A discloses a cooler for an inverter of an electric vehicle. Water is used as the coolant. An abnormality in the cooler is detected on the basis of a temperature difference between a water temperature (a coolant temperature) and a temperature of the inverter. Further, JP 2012-52504 A discloses an engine cooler. In this technique, an engine output is calculated from an engine rotation speed and an output torque. A target water temperature (a target coolant temperature) is set on the basis of the calculated engine output. A pump and a fan of the cooler are then controlled so as to realize the set target water temperature.

Japanese Patent Application Publication No. 2010-216386 (JP 2010-216386 A) also discloses an engine cooler. JP 2010-216386 A discloses a technique for estimating a water temperature in a position removed from a water temperature sensor (a coolant temperature sensor). In this technique, the water temperature in a predetermined position removed from a temperature sensing portion of the water temperature sensor is estimated using a parameter that correlates with a difference between an amount of heat radiation from the engine in the temperature sensing portion and an amount of heat radiation from the engine in the predetermined position.

SUMMARY OF THE INVENTION

When the temperature of the coolant is used to control the cooler, it is desirable to ensure that the coolant temperature can be measured as accurately as possible. It is possible to measure the coolant temperature directly, but in this case, a sensor is submerged in a liquid, and therefore measures such as waterproofing the sensor must be taken, leading to an increase in cost. Hence, a temperature sensor may be attached to a casing through which the coolant flows so as not to contact the coolant directly, and a measurement value of the temperature sensor may be used as an estimated value of the coolant temperature. In this case, however, it is the temperature of the casing that is measured directly rather than the temperature of the coolant, and therefore a time lag occurs while waiting for variation in the temperature of the coolant to be transferred to the casing and reflected by the temperature sensor. This specification provides a technique for compensating for this time lag. Note that "compensating for the time lag" means estimating an actual value of the coolant temperature from a temperature measurement value obtained after the time lag.

A cooler related to the present invention includes a casing, a temperature sensor, and an estimator. The casing has a flow passage through which a liquid coolant passes. The temperature sensor is attached to the casing so as not to contact the coolant directly. The temperature sensor is configured to measure a temperature of the casing at intervals of a predetermined sampling period. The estimator is configured to estimate a coolant temperature from a measurement value of the temperature sensor. The estimator is configured to determine a difference by subtracting an immediately preceding measurement value from a current measurement value, determine a correction value from the difference, and output an estimated value of the coolant temperature. The estimated value is obtained by adding the correction value to the current measurement value. The correction value is obtained by multiplying a gain by the difference. The gain is determined from a time constant, the gain is determined according to a flow rate of the coolant. The time constant is obtained when a transfer function of heat transferred from the coolant to the temperature sensor (3) is modeled as a first order lag system.

With the algorithm described above, the temperature of the coolant in the interior of the casing of the cooler can be estimated accurately from the temperature sensor attached to the casing.

An another aspect of the cooler related to the present invention includes a casing, a temperature sensor, and an estimator. The casing has a flow passage through which a liquid coolant passes. The temperature sensor is attached to the casing (12) so as not to contact the coolant directly. The temperature sensor is configured to measure a temperature of the casing at intervals of a predetermined sampling period. The estimator is configured to estimate a coolant temperature from a measurement value of the temperature sensor. The estimator is configured to store a gain map for each flow rate of the coolant. The estimator is configured to specify a gain corresponding to a third difference from the gain map. The estimator is configured to output an estimated value of the coolant temperature. The estimated value is obtained by adding a value obtained by multiplying the third difference by the gain to a current measurement value of the temperature sensor. The third difference is obtained by subtracting an immediately preceding measurement value from the current measurement value. The gain is obtained by dividing a first difference by a second difference. The gain map is a map on which the second difference is associated with the gain. The first difference is obtained by subtracting a measurement value of the temperature sensor from an actual temperature of the coolant at sampling period intervals while varying temperature of the coolant in steps. The second difference is obtained by subtracting a second measurement value from a first measurement value. The second measurement value is measured in an immediately preceding sampling period from a sampling period of the first measurement value.

With the algorithm described above, the temperature of the coolant in the interior of the casing of the cooler can be estimated accurately from the temperature sensor attached to the casing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A first order lag system model (in other words, a time constant) of a transfer function is determined in advance from hardware characteristics of a cooler and a flow rate of a coolant. An estimator stores a gain for each of several coolant flow rates, and specifies a gain in accordance with the flow rate at the time of temperature measurement. More specifically, the gain corresponds to a value obtained by dividing the time constant of the modeled first order lag system by a sampling period.

The gain is related to a difference between an input and an output of a step response of a transfer function of heat transferred from the coolant to a temperature sensor. More specifically, the gain corresponds to a value obtained by dividing a difference (a first difference) that is obtained by subtracting a measurement value of the temperature sensor from an actual temperature of the coolant at sampling period intervals while varying the temperature of the coolant in steps by a difference (a second difference) that is obtained by subtracting a measurement value of an immediately preceding sampling period from the measurement value of the temperature sensor at that time. Hence, the estimator may estimate the coolant temperature using a gain map on which the gain is associated with the second difference obtained in each sampling period for each coolant flow rate. The gain map may be determined in advance while measuring the actual temperature of the coolant in an experiment or the like. The gain map is therefore specified in advance and stored in the estimator. Note that since the step response varies in accordance with the flow rate of the coolant, the estimator stores the gain map for each of several flow rates.

A coolant temperature estimation algorithm using a gain map such as that described above is as follows. The estimator specifies from the gain map a gain corresponding to a difference (a third difference) that is obtained by subtracting the measurement value obtained by the temperature sensor during the previous sampling period from the measurement value obtained during the current sampling period.

The estimator then adds a value obtained by multiplying the third difference by the specified gain to the measurement value of the current sampling period, and outputs a value obtained as a result as an estimated value of the coolant temperature.

The algorithm using the gain map, described above, can be applied to any model of the transfer function of the heat transferred from the coolant to the temperature sensor. The above algorithm is particularly effective in cases where the transfer function can be modeled as a second order lag system. Note, however, that in the step response of a second order lag system, the difference obtained by subtracting the measurement value of the previous sampling period from the measurement value of the current sampling period increases over time and then starts to decrease midway. In other words, two gains may be associated with a single difference. When specifying the gain, therefore, the estimator specifies the gain from the gain map in accordance with the difference (the third difference) obtained by subtracting the measurement value obtained by the temperature sensor in the previous sampling period from the measurement value obtained in the current sampling period, and a difference obtained according to whether the third difference exhibits an increasing tendency or a decreasing tendency over time.

Figure 1:
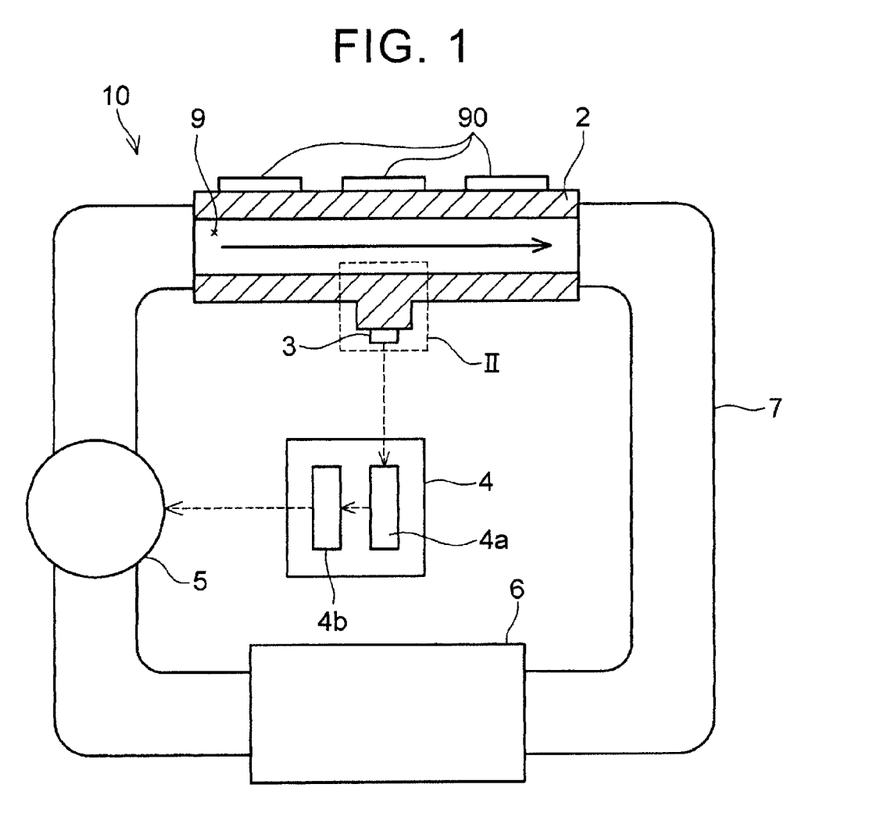
FIG. 1 is a schematic view of a cooler according to a first embodiment.

Referring to FIG. 1, a cooler 10 according to a first embodiment will be described. The cooler 10 is a liquid cooler that uses water (or long life coolant (LLC)) as a coolant, and cools a semiconductor element 90 attached to a casing 2. In FIG. 1, the casing 2 alone is shown in cross-section. An arrow drawn in the interior of the casing 2 represents a flow of the coolant. The casing 2 is formed from a metal, typically aluminum, having high thermal conductivity. A flow passage 9 is formed in the interior of the casing 2, and the coolant flows through this flow passage. The cooler 10 includes, in addition to the casing 2, a radiator 6 that cools the coolant, a circulation passage 7 that connects the radiator 6 to the casing 2, a pump 5 that circulates the coolant, a temperature sensor 3, and a controller 4 that controls the pump 5. The controller 4 adjusts an output of the pump 5 on the basis of a measurement value of the temperature sensor 3. Broadly speaking, the controller 4 raises the output of the pump 5 when the measurement value of the temperature sensor 3 is high, and lowers the output of the pump 5 when the measurement value of the temperature sensor 3 is low. Further, when a coolant temperature estimated from the measurement value of the temperature sensor 3 exceeds a predetermined threshold, the controller 4 transmits a signal to a separate controller (not shown) that controls the semiconductor element 90. Upon reception of the signal from the controller 4, the separate controller suppresses a current flowing through the semiconductor element 90 in order to suppress heat generation by the semiconductor element 90.

The temperature sensor 3 is attached to an outer side of the casing 2 so as not to contact the liquid coolant directly. Strictly speaking, therefore, the temperature measured by the temperature sensor 3 is the temperature of the casing 2 rather than the temperature of the coolant. A time lag occurs while waiting for variation in the temperature of the coolant to be transferred to the casing 2 and reflected in the measurement value of the temperature sensor 3. The controller 4 estimates the temperature of the coolant from the measurement value of the temperature sensor 3 while taking this time lag into account, and adjusts the output of the pump 5 on the basis of the result. Two programs are packaged in the controller 4. One is a temperature estimation program 4a used to estimate the temperature of the coolant from the measurement value of the temperature sensor 3, and the other is a pump control program 4b used to adjust the output of the pump 5 on the basis of the estimated coolant temperature. Next, the temperature estimation program 4a and the time lag between variation in the temperature of the coolant and reflection thereof in the measurement value of the temperature sensor 3 will be described.

Figure 2:
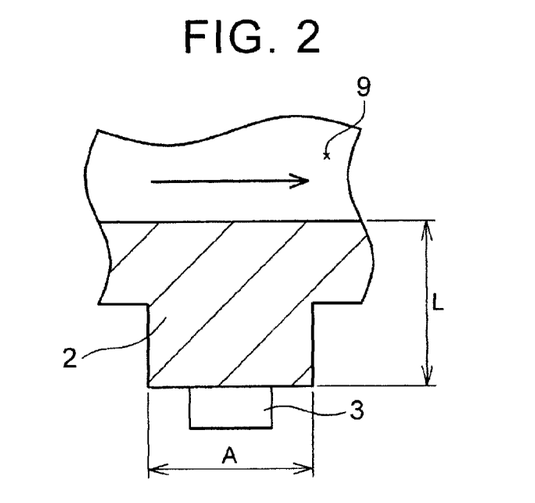
FIG. 2 is an enlarged view of a range indicated by a dotted line II in FIG. 1.

First, the time lag will be described. FIG. 2 is an enlarged view of a range indicated by a dotted line II in FIG. 1. A distance from the coolant to the temperature sensor 3, or in other words a thickness of the casing 2 from an inner surface of the flow passage 9 to the temperature sensor 3, is represented by a reference symbol L. A surface area of a heat path along which the heat of the coolant is transferred to the temperature sensor 3 is represented by a reference symbol A. To facilitate understanding of the heat path, FIGS. 1 and 2 show a structure in which the temperature sensor 3 is attached to a projecting portion provided on the outer side of the casing 2. A sectional area of the projecting portion is represented by the reference symbol A. In addition, a thermal resistance from the coolant to the temperature sensor 3 is represented by a reference symbol R, and a thermal capacity is represented by a reference symbol C. When the transfer function of the heat transferred from the coolant to the temperature sensor 3 is modeled as a first order lag system, a time constant Ta thereof can be expressed by (Equation 1), shown below.

[Numeral 1]

$$Ta = R \times C \qquad \text{(Equation 1)}$$

The thermal resistance R can be expressed by (Equation 2), shown below, using the distance L from the coolant to the temperature sensor 3, the surface area A of the heat path, and a thermal conductivity H of the coolant.

[Numeral 2]

$$R = \frac{L}{(H \times A)} \qquad \text{(Equation 2)}$$

Figure 3:
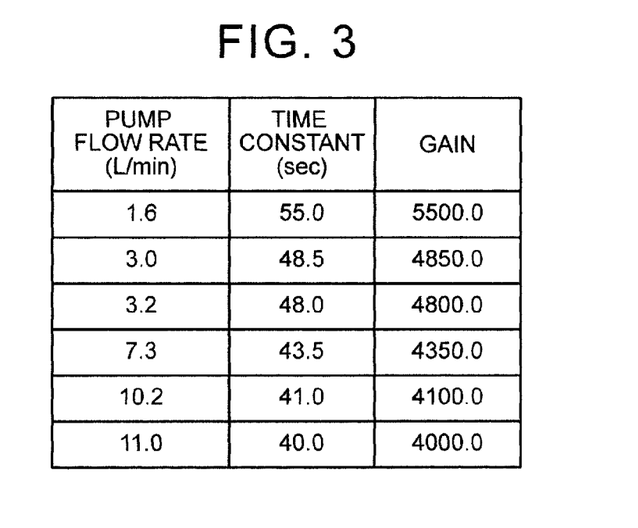
FIG. 3 is a view showing an example of a relationship between a flow rate and a time constant.

The thermal conductivity H of the coolant is dependent on a flow rate of the coolant. Broadly speaking, the thermal conductivity H of the coolant is proportionate to the flow rate of the coolant. Hence, when the transfer function of the heat transferred from the coolant to the temperature sensor 3 is modeled as a first order lag system, the resulting time constant Ta is dependent on the flow rate of the coolant. It is evident from (Equation 1) and (Equation 2) that the time constant Ta decreases as the flow rate increases. In other words, the time lag occurring when heat is transferred from the coolant to the temperature sensor 3 decreases as the flow rate increases. FIG. 3 shows an example of a relationship between a pump flow rate of the cooler and the time constant. A "gain" in FIG. 3 is a value obtained by dividing the time constant by 0.01. Here, 0.01 (sec) is a sampling period in which the temperature estimation program 4a of the controller 4 obtains the measurement value of the temperature sensor 3. Further, the pump flow rate corresponds to an output command value applied to the pump 5 by the pump control program 4b of the controller 4.

The temperature estimation program 4a will now be described. The controller 4 stores the gain map shown in FIG. 3. The temperature estimation program 4a estimates the coolant temperature from the measurement value of the temperature sensor 3 using a following algorithm. In each sampling period, the temperature estimation program 4a subtracts a measurement value obtained by the temperature sensor 3 in an immediately preceding sampling period from a measurement value obtained in a current sampling period. The obtained value will be referred to as a measurement value difference. Further, the temperature estimation program 4a specifies the pump flow rate from the output command value applied to the pump 5. The output command value and the pump flow rate also have a unique relationship, and the controller 4 stores this relationship in advance. The temperature estimation program 4a specifies the pump flow rate from this relationship. The temperature estimation program 4a then specifies the gain corresponding to the pump flow rate by referring to the gain map shown in FIG. 3. The temperature estimation program 4a then multiplies the specified gain by the measurement value difference. The result corresponds to a temperature difference generated due to the time lag, or in other words an estimated value of a temperature difference between an actual temperature of the coolant and the measurement value of the temperature sensor 3. The estimated value of the temperature difference will be referred to hereafter as a "correction value". The temperature estimation program 4a calculates the correction value in each sampling period, and outputs a value obtained by adding the correction value to the measurement value obtained by the temperature sensor 3 in the current sampling period to the pump control program 4b as an estimated value of the coolant temperature. The pump control program 4b adjusts the output of the pump 5 on the basis of the estimated value of the coolant temperature.

Figure 4:
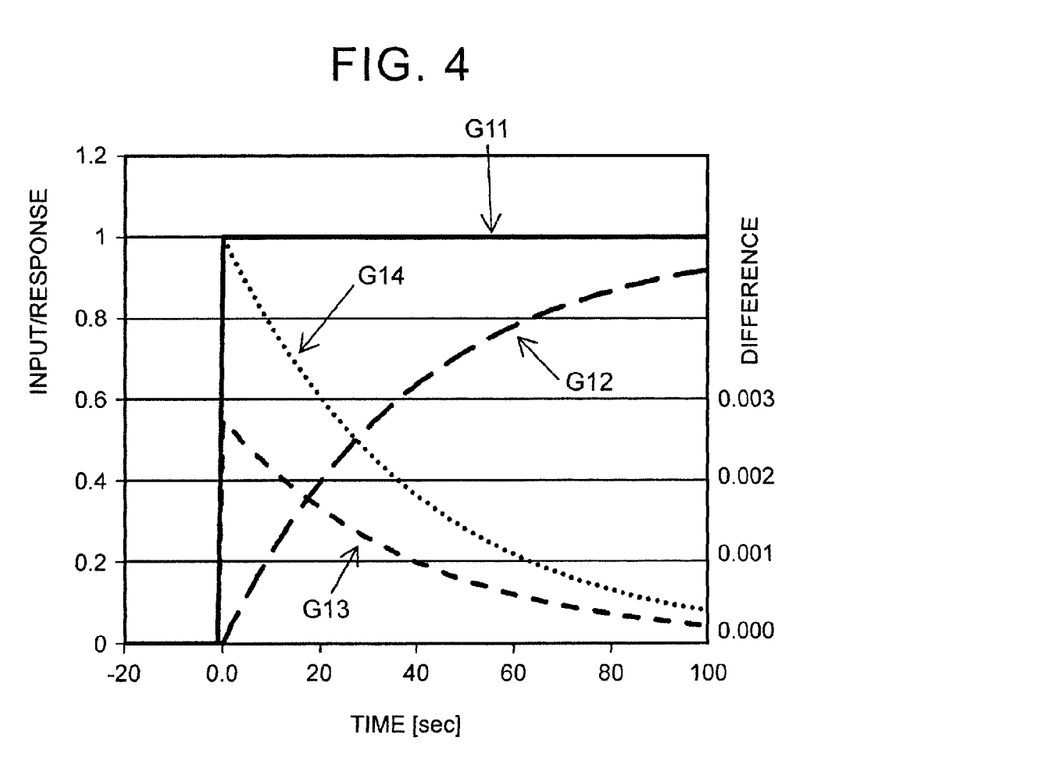
FIG. 4 is a graph showing a relationship between a step response obtained when a transfer function of heat transferred from a coolant to a temperature sensor is modeled as a first order lag system and a correction value.

As shown in FIG. 2, as long as a casing wall between the temperature sensor 3 and the coolant flow passage 9 is formed in a simple shape, the transfer function of the heat transferred from the coolant to the temperature sensor can be represented by a first order lag system. FIG. 4 shows a relationship between the correction value and a step response obtained when the transfer function of the heat transferred from the coolant to the temperature sensor is modeled as a first order lag system. A graph G11 shows a step input, and a graph G12 shows the response of the first order lag system. The graph G11 corresponds to a simulation of variation in an actual water temperature. The graph G12 corresponds to a simulation of the measurement value of the temperature sensor 3 relative to the step input. In other words, FIG. 4 corresponds to a simulation in which the transfer function of the heat transferred from the coolant to the temperature sensor 3 is modeled as a first order lag system.

A graph G13 shows the difference (the measurement value difference) obtained by subtracting the measurement value obtained by the temperature sensor 3 in the previous sampling period from the measurement value obtained in the current sampling period. The graph G13 corresponds to a right-hand scale. A graph G14 shows the value obtained by multiplying the gain by the measurement value difference, or in other words the correction value. A value obtained by adding the correction value (the graph G14) to the measurement value of the temperature sensor 3 (the graph G12) is equal to the graph G11. In other words, a value obtained by adding the correction value to the measurement value of the temperature sensor 3 serves as the estimated value of the coolant temperature, and in the simulation, the estimated value of the coolant temperature matches the step input, or in other words the actual temperature of the coolant.

As described above, the gain is obtained by dividing the time constant obtained when the transfer function of the heat of the coolant is modeled as a first order lag system by the sampling period. Further, the correction value is a value obtained by multiplying the gain by the measurement value difference (the graph G13 in FIG. 4). A relationship between the measurement value difference, the gain, and the correction value will be described below.

The response (the graph G12 in FIG. 4) to the step input when the transfer function of the heat transferred from the coolant to the temperature sensor 3 is modeled as a first order lag system is expressed by (Equation 3), shown below. In all equations from (Equation 3) onward, reference symbols G11 (t), G12 (t), G13 (t), and G14 (t) express the respective graphs (G11 to G14) of FIG. 4 as time functions. (Equation 4) is obtained by time-differentiating (Equation 3). Further, as described above, Ta is the time constant of the modeled first order lag system.

[Numeral 3]

$$G12(t) = 1 - e^{-\frac{t}{Ta}} \quad \text{(Equation 3)}$$

[Numeral 4]

$$\frac{d}{dt}G12(t) = -\left(-\frac{1}{Ta}\right)e^{-\frac{t}{Ta}} \quad \text{(Equation 4)}$$
$$= \frac{1}{Ta}e^{-\frac{t}{Ta}}$$
$$= G13(t)$$

(Equation 4) corresponds to the graph G13 (the measurement value difference) in FIG. 4. (Equation 5) is obtained from (Equation 4).

[Numeral 5]

$$G13(t) \times Ta = e^{-\frac{t}{Ta}} = G14(t) \quad \text{(Equation 5)}$$

A right side of (Equation 5) corresponds to the correction value (the graph G14 in FIG. 4). This is evident from (Equation 6), shown below.

[Numeral 6]

$$G12(t) + G14(t) = (1 - e^{-\frac{t}{Ta}}) + e^{-\frac{t}{Ta}} \quad \text{(Equation 6)}$$
$$= 1 \approx G11(t)$$

In control processing, when the sampling period is set at 10 (msec), the correction value corresponds to (measurement value difference)×(Ta×100). At this time, the correction value corresponds in a physical sense to (measurement value difference/10 (msec))×Ta.

Figure 5:
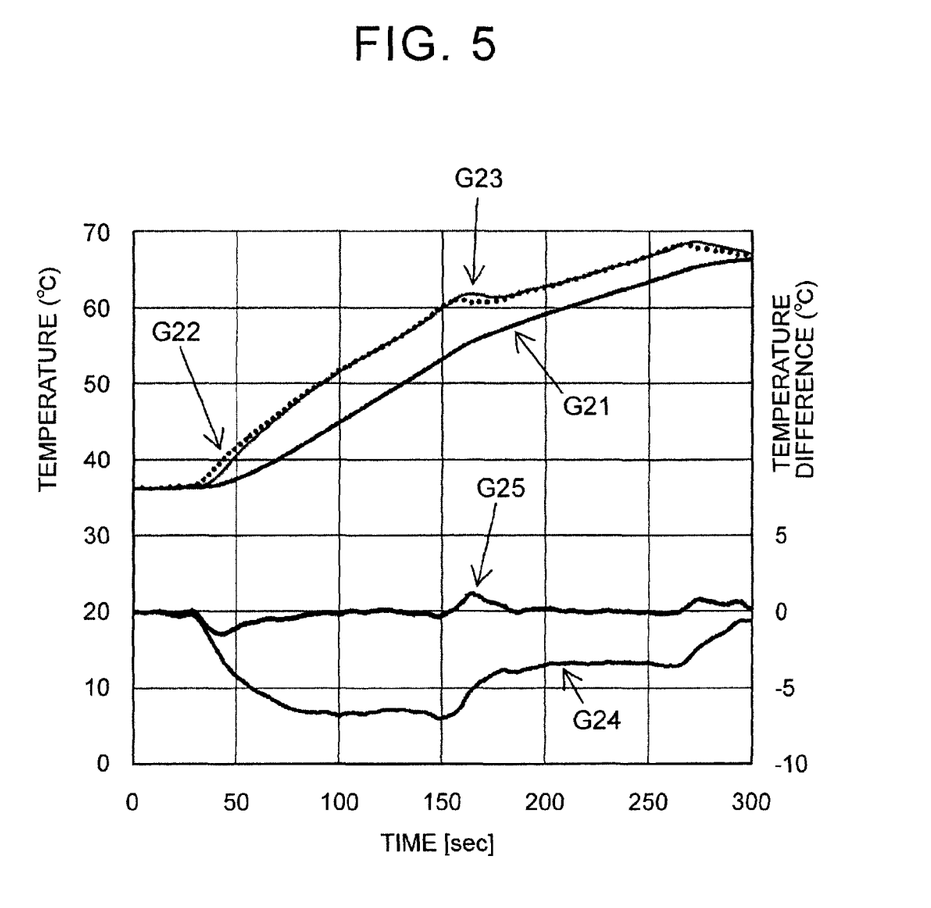
FIG. 5 is a graph showing results of an experiment performed to verify a correction effect.

FIG. 5 shows experiment results obtained in a comparison between the actual temperature of the coolant and the estimated value based on the measurement value of the temperature sensor 3. In this experiment, the actual temperature of the coolant was measured. A graph G21 shows the measurement value of the temperature sensor 3, and a graph G22 (a dotted line) shows the actually measured coolant temperature. The actual temperature starts to increase from approximately 37° C. at a time of approximately 50 seconds, and becomes constant at approximately 68° C. from a time of 300 seconds onwards. The measurement value of the temperature sensor 3 increases at a delay relative to the variation in the actual temperature of the coolant.

A graph G23 (a thin line graph) shows the estimated value of the coolant temperature obtained using the algorithm described above. A graph G24 shows a temperature difference between the actual coolant temperature (the dotted line graph G22) and the measurement value of the temperature sensor 3 (the graph G21). A graph G25 shows a temperature difference between the actual coolant temperature (the dotted line graph G22) and the estimated value (the graph G23). The graph G24 and the graph G25 correspond to a right-hand scale. It can be seen that the estimated value (the graph G23) obtained using the algorithm described above closely matches the actual temperature (the dotted line graph G22).

In the case of the cooler 10 according to the first embodiment, as shown in FIG. 2, the temperature sensor 3 opposes the coolant flow passage 9, and therefore the transfer function of the heat transferred from the coolant to the temperature sensor 3 can be modeled favorably as a simple first order lag system. In this case, the temperature of the coolant can be estimated favorably using the algorithm described above, which is based on the time constant of the first order lag system.

Figure 6:
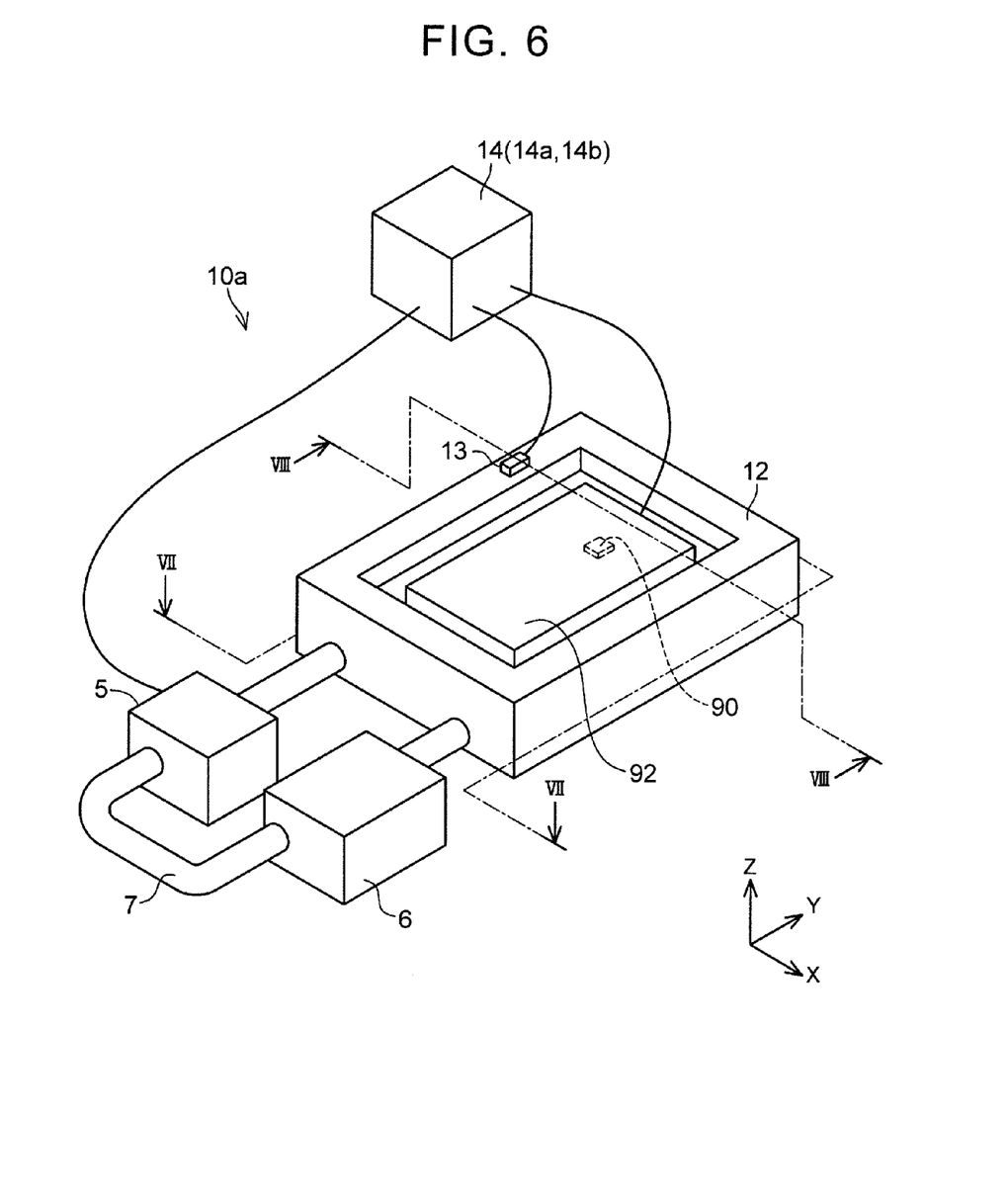
FIG. 6 is a schematic view of a cooler according to a second embodiment.
Figure 7:
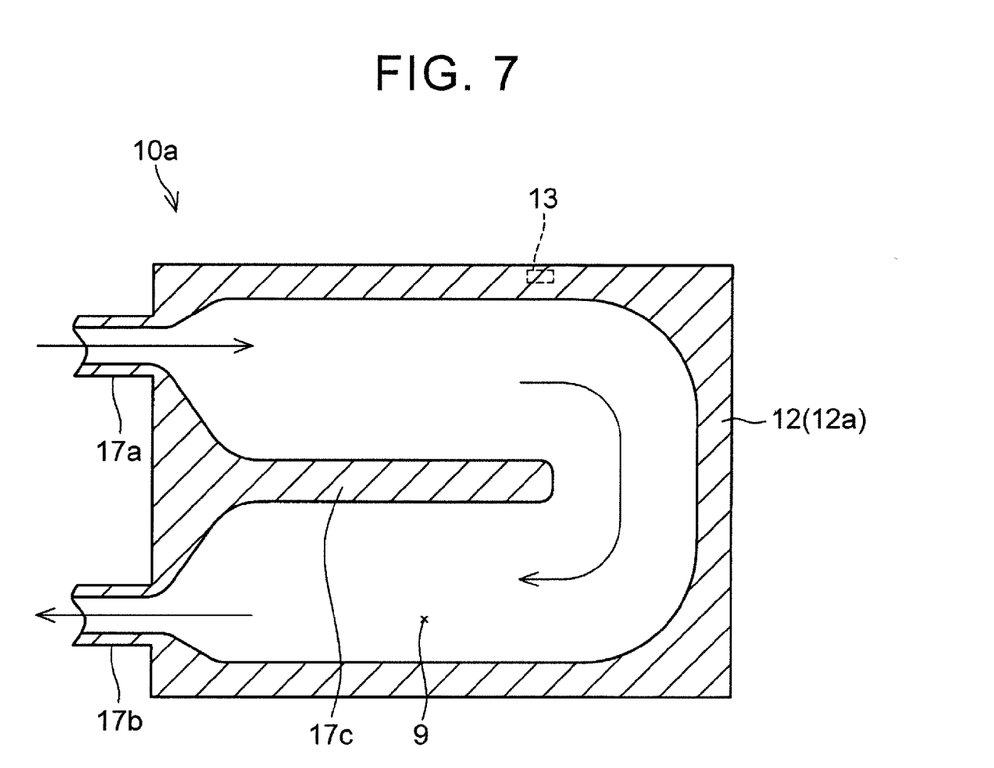
FIG. 7 is a sectional view taken along a VII-VII line in FIG. 6.
Figure 8:
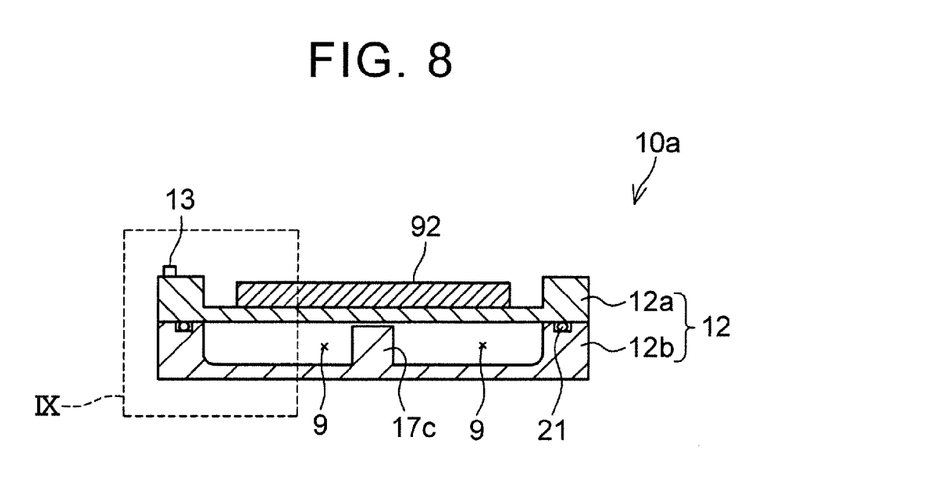
FIG. 8 is a sectional view taken along a VIII-VIII line in FIG. 6.

Next, a cooler 10a according to a second embodiment will be described. FIG. 6 is a schematic perspective view of the cooler 10a. FIG. 7 is a sectional view taken along a VII-VII line in FIG. 6, and FIG. 8 is a sectional view taken along a VIII-VIII line in FIG. 6. The cooler 10a cools the semiconductor element 90, which is packaged in a power converter 92. The cooler 10a includes a casing 12 that contacts the power converter 92, a temperature sensor 13, the pump 5, the radiator 6, the circulation passage 7, and a controller 14.

The cooler 10a uses a liquid coolant. More specifically, the coolant is water or LLC. The coolant is circulated between the casing 12 and the radiator 6 by the pump 5 and the circulation passage 7. As shown in FIGS. 7 and 8, the flow passage 9 through which the coolant passes is formed in the interior of the casing 12. The casing 12 is formed from aluminum, which has high thermal conductivity. The casing 12 has a flat plate shape, and the power converter 92 is attached to one surface thereof. Note that in the drawing, the power converter 92 is depicted as a simplified rectangular parallelepiped. In actuality, however, the power converter 92 has a complicated shape. The semiconductor element 90 serving as the cooling subject is disposed in the power converter 92.

A partition plate 17c is provided in the interior of the casing 12, and the flow passage 9 is bent into a U shape about the partition plate 17c. The coolant supplied by the pump 5 flows into the casing 12 through an inflow port 17a. The inflowing coolant absorbs heat from the semiconductor element 90 of the power converter 92 while flowing through the U-shaped flow passage 9. Note that the semiconductor element 90 is typically an insulated gate bipolar transistor (IGBT) through which a large current flows in a power conversion apparatus. However, the technique disclosed in this specification is not dependent on the type of the semiconductor element serving as the cooling subject.

The coolant, having increased in temperature after absorbing heat, is discharged from the casing 12 through a discharge port 17b. The coolant then moves to the radiator 6 through the circulation passage 7. The coolant exchanges heat with air in the radiator 6, and is thus cooled. The reduced-temperature coolant is then pumped back into the casing 12 by the pump 5.

The flow rate of the coolant flowing through the flow passage 9 is determined by the output of the pump 5. A temperature estimation program 14a used to estimate the temperature of the coolant from a measurement value of the temperature sensor 13 and a pump control program 14b used to adjust the output of the pump 5 on the basis of the estimated temperature are packaged in the controller 14.

As shown in FIGS. 7 and 8, the temperature sensor 13 is attached to an outer side of the casing 12. In other words, the coolant temperature sensor 13 is attached to the casing 12 so as not to contact the liquid coolant. As shown in FIG. 8, the casing 12 is constituted by a main body 12a and a cover 12b. A gasket 21 is provided between the main body 12a and the cover 12b of the casing 12 in order to secure airtightness in the flow passage 9.

Figure 9:
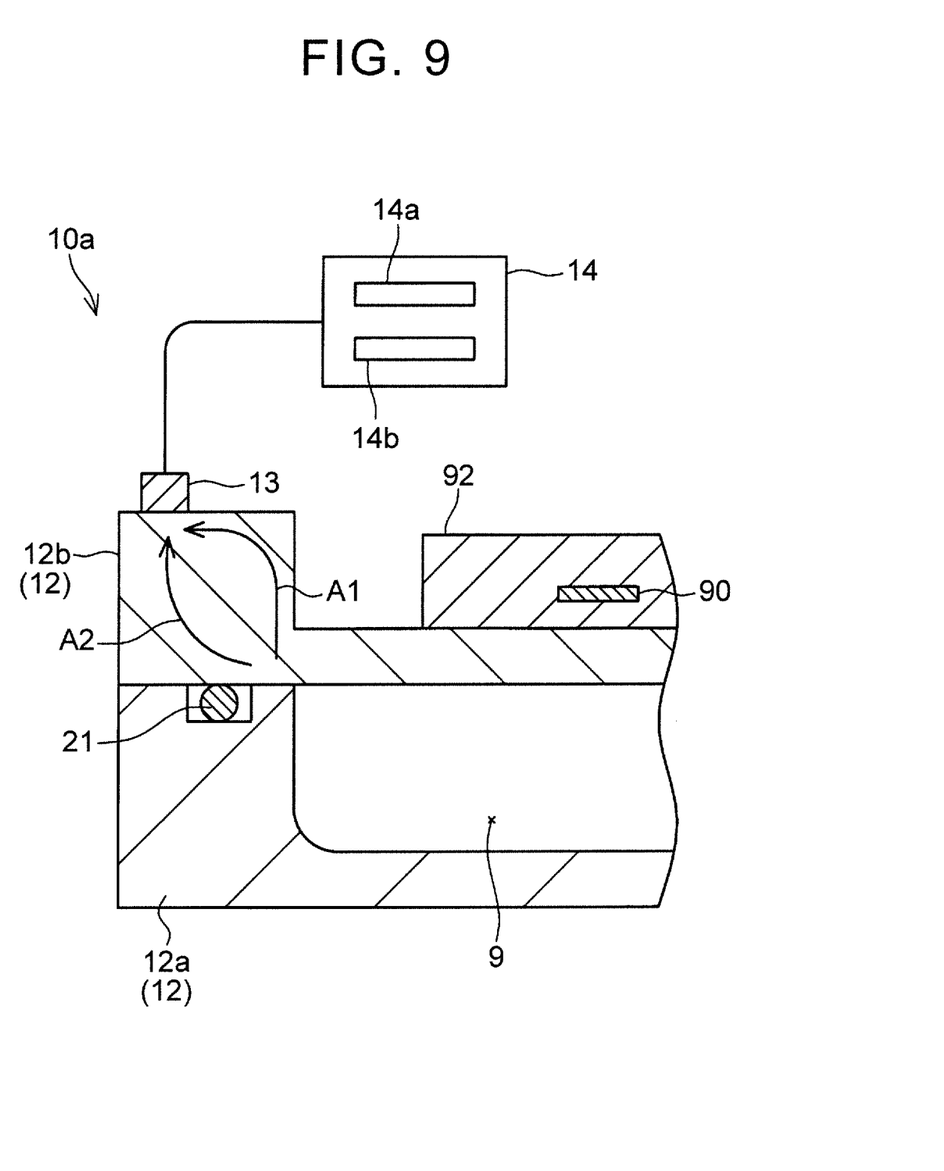
FIG. 9 is an enlarged view of a range IX in FIG. 8.

FIG. 9 is an enlarged view showing a range indicated by a dotted line IX in FIG. 8. The temperature sensor 13 is removed from the flow passage 9, and therefore variation in the coolant temperature appears in the measurement value of the temperature sensor 13 at a delay. Arrows A1, A2 in FIG. 9 show schematic paths along which the heat from the coolant is transferred. Since the temperature sensor 13 does not oppose the flow passage 9, the temperature is transferred along two paths, as indicated by the arrows A1 and A2. In this case, the transfer function of the heat transferred from the coolant to the temperature sensor 13 cannot be expressed favorably by a simple first order lag system model. In a case such as this, therefore, the transfer function is preferably modeled at least as a second order lag model.

Figure 10:
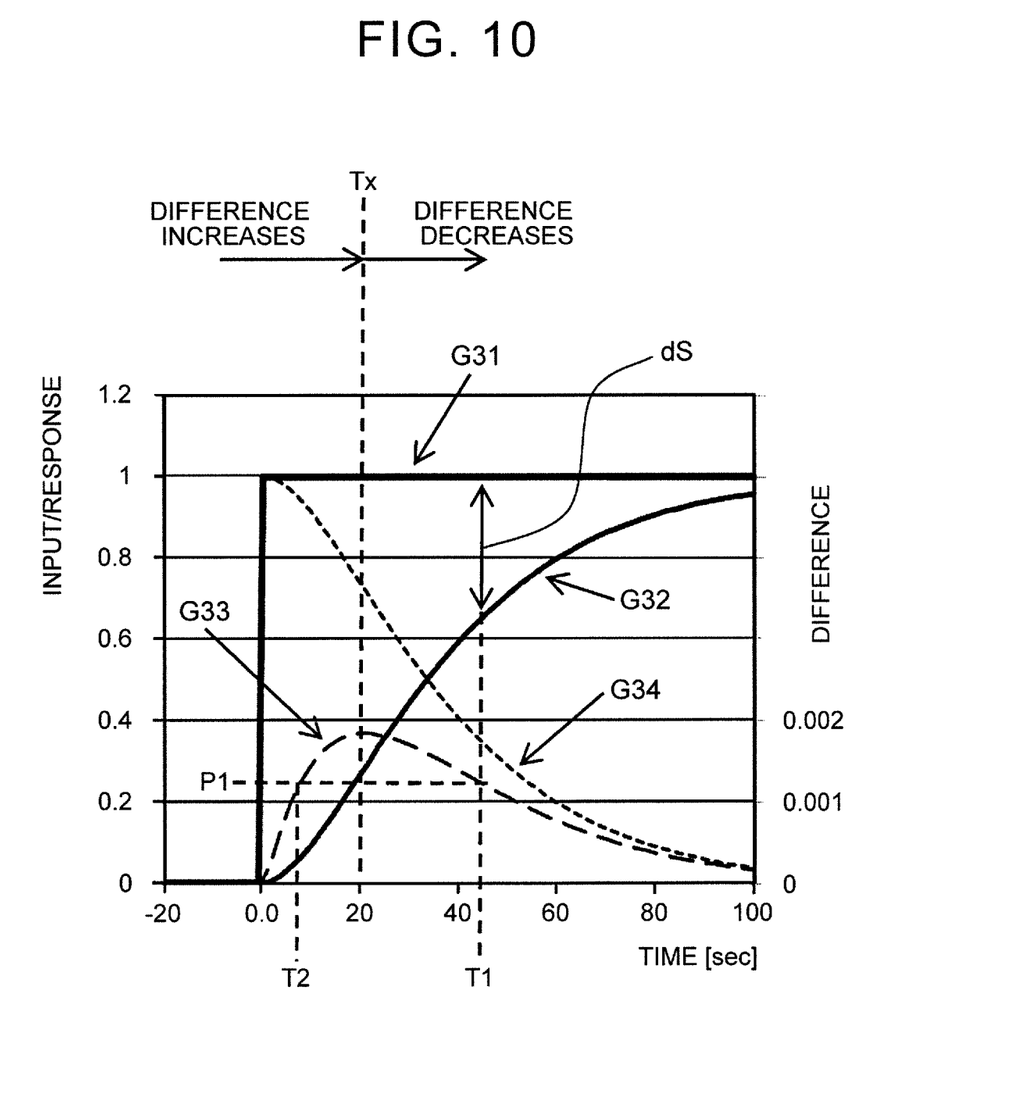
FIG. 10 is a graph showing a relationship between a step response obtained when the transfer function of the heat transferred from the coolant to the temperature sensor is modeled as a second order lag system and the correction value.

FIG. 10 is a graph showing a relationship between the correction value and the step response obtained when the transfer function of the heat transferred from the coolant to the temperature sensor 13 in the cooler 10a shown in FIGS. 6 to 9 is modeled as a second order lag system. A graph G31 shows the step input. A graph G32 shows the response of the second order lag system. The graph G31 depicts a simulation of variation in the actual temperature of the coolant, and the graph G32 depicts a simulation of the measurement value of the temperature sensor 13. A graph G33 shows a simulation result of a difference (a second difference) obtained by subtracting the measurement value obtained by the temperature sensor 13 in the previous sampling period from the measurement value obtained in the current sampling period. For example, a temperature difference dS in FIG. 10 indicates a difference (a first difference) obtained by subtracting the measurement value of the temperature sensor 13 (the graph G32 serving as the simulation thereof) at a time T1 from the actual temperature of the coolant (the graph G31 serving as the simulation thereof) at that time. Note that the value of the second difference at the time T1 is represented by a reference symbol P1. In the second embodiment, the gain corresponds to a value (dS/P1) obtained by dividing the first difference (dS at the time T1), which is obtained by subtracting the measurement value of the temperature sensor 13 from the actual coolant temperature obtained at sampling period intervals while varying the temperature of the coolant in steps, by the value P1 of the second difference at the time T1, which is obtained by subtracting the measurement value obtained by the temperature sensor 13 in the immediately preceding sampling period from the measurement value obtained at that time (i.e. the difference obtained by subtracting the measurement value obtained by the temperature sensor 13 in the previous sampling period from the measurement value obtained in the current sampling period). A graph G34 in FIG. 10 shows a value obtained by multiplying the second difference (the graph G33) by the gain at each time. The graph G34 corresponds to the correction value of the simulation. A value obtained by adding the correction value (the graph G34) to the measurement value of the temperature sensor at each time (the graph G32) serves as the estimated value of the actual coolant temperature (the graph G31). In the simulation, the value obtained by adding the graph G34 to the graph G32 matches the graph G31 (the step input).

The graphs G31, G32 in FIG. 10 are simulations obtained when the transfer function of the heat is modeled as a second order lag system, whereas the controller 14 stores a gain map based on a response actually measured by the actual cooler 10a. The gain map is obtained as follows. First, an experiment is performed to measure the actual coolant temperature and the measurement value of the temperature sensor 13, whereupon the actual response of the cooler 10a corresponding to the graphs G31 and G32 is obtained. Then, in each sampling period of the response, the value (the gain) obtained by dividing the first difference at that time by the second difference is obtained. The obtained gain is associated with the second difference. The experiment and calculation are performed for each of several flow rates, whereby the gain map is obtained for each flow rate.

The temperature estimation program 14a packaged in the controller 14 estimates the temperature of the coolant using the gain map described above. An algorithm used at this time will be described below. The temperature estimation program 14a repeats the following processing at intervals of the sampling period. The temperature estimation program 14a obtains the measurement value of the temperature sensor 13 and the flow rate of the coolant. The flow rate of the coolant is obtained from the output command value applied to the pump 5, similarly to the first embodiment. The temperature estimation program 14a then determines the third difference by subtracting the measurement value obtained by the temperature sensor 13 in the previous sampling period from the measurement value obtained in the current sampling period. The temperature estimation program 14a specifies the gain map corresponding to the current coolant flow rate. The gain corresponding to the second difference, which is equal to the third difference, is then specified on the gain map. Here, when the transfer function of the heat transferred from the coolant to the temperature sensor is modeled as a second order lag system such as that shown in FIG. 10 (or an approximation thereof), two gains are associated with a single value of the third difference. In FIG. 10, for example, the second difference is P1 at both the time T1 and the time T2. However, the gain at the time T1 differs from the gain at the time T2 (the value of the gain G34 is different at the time T1 and the time T2). Hence, the temperature estimation program 14a determines which of the two gains is appropriate according to whether the third difference exhibits a continuous increasing tendency or a continuous decreasing tendency. In the simulation shown in FIG. 10, the third difference exhibits an increasing tendency prior to a time Tx, and exhibits a decreasing tendency thereafter. Therefore, when the third difference of the previous sampling period is smaller than the third difference of the current sampling period, the temperature estimation program 14a determines that the third difference is exhibiting an increasing tendency, and specifies the gain that corresponds to the second difference matching the third difference by searching the gain map in a range prior to the time Tx in FIG. 10. Conversely, when the third difference of the previous sampling period is larger than the third difference of the current sampling period, the temperature estimation program 14a determines that the third difference is exhibiting a decreasing tendency, and specifies the gain that corresponds to the second difference matching the third difference by searching the gain map in a range from the time Tx in FIG. 10 onward. Note that FIG. 10 shows simulation results, and a time corresponding to the time Tx is specified from graphs obtained by actual measurement.

After specifying the gain, the temperature estimation program 14a adds the value (the correction value) obtained by multiplying the third difference by the specified gain to the measurement value obtained by the temperature sensor 13 in the current sampling period. The result serves as the estimated value of the coolant temperature. The temperature estimation program 14a then outputs the estimated value of the coolant temperature to the pump control program 14b.

Figure 11:
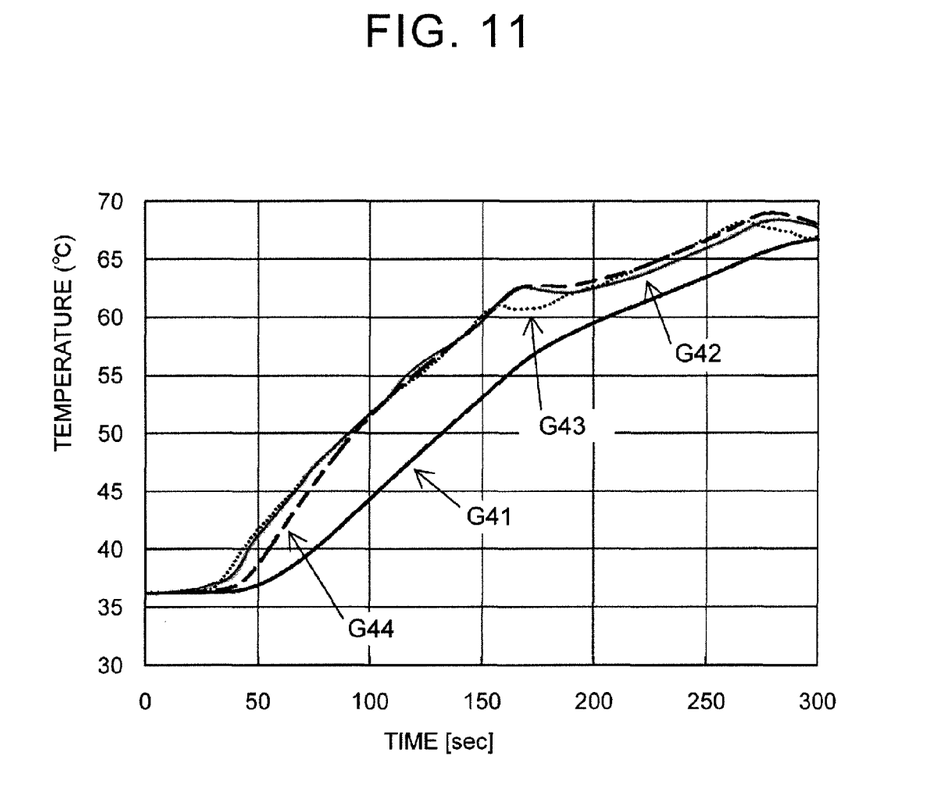
FIG. 11 is a graph showing results of an experiment performed to verify a correction effect according to the second embodiment.

FIG. 11 shows results verifying the effects of the algorithm employed by the temperature estimation program 14a according to the second embodiment. A graph G41 shows the measurement value of the temperature sensor 13. A graph G43 (a dotted line) shows the coolant temperature actually measured in an experiment. A graph G42 (a thin line graph) shows the estimated value of the coolant temperature obtained using the algorithm according to the second embodiment. A graph G44 (a dotted line) shows the estimated value of the coolant temperature obtained using the algorithm according to the first embodiment. The estimated temperature value (the graph G42) of the algorithm according to the second embodiment matches the actual measurement value (the graph G43 (the dotted line)) more closely than the estimated temperature value (the graph G44) of the algorithm according to the first embodiment.

Figure 12:
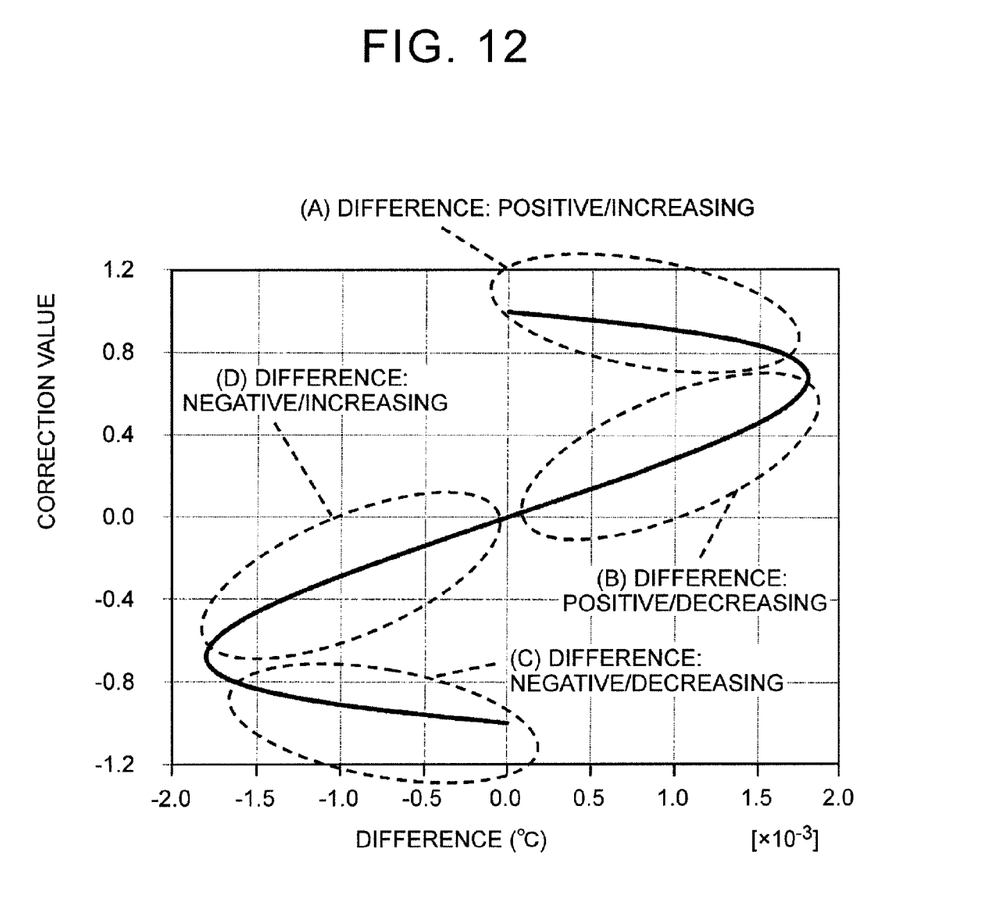
FIG. 12 is a graph showing an example of a relationship between a third difference and the correction value.

FIG. 12 shows an example of a relationship between the third difference and the correction value at a specific flow rate. The abscissa in FIG. 12 shows the third difference (the difference obtained by subtracting the measurement value obtained by the temperature sensor 13 in the previous sampling period from the measurement value obtained in the current sampling period). The ordinate shows the correction value. The correction value is obtained by multiplying the third difference by the gain at the specific flow rate. FIG. 12 shows a case in which two gains correspond to each value of the difference. When the third difference is a positive value exhibiting an increasing tendency over time, the temperature estimation program 14a specifies the gain within a range indicated by (A) in FIG. 12. When the third difference is a positive value exhibiting a decreasing tendency over time, the temperature estimation program 14a specifies the gain within a range indicated by (B) in FIG. 12. When the third difference is a negative value exhibiting an increasing tendency over time, the temperature estimation program 14a specifies the gain within a range indicated by (D) in FIG. 12. When the third difference is a negative value exhibiting a decreasing tendency over time, the temperature estimation program 14a specifies the gain within a range indicated by (C) in FIG. 12. FIG. 12 corresponds to an example of the gain map.

Points to be taken into consideration in relation to the techniques described in the embodiments will now be described. The controller 4 that executes the temperature estimation program 4a and the controller 14 that executes the temperature estimation program 14a correspond to an example of an estimator.

In the first embodiment, the correction value applied to the measurement value is determined in accordance with the time constant obtained when the heat transfer function from variation in the actual coolant temperature to measurement by the temperature sensor is approximated by a first order lag system. In a case where the temperature transfer function from the coolant flowing through the flow passage to the temperature sensor can be approximated by a first order lag system, the coolant temperature can be estimated accurately using the algorithm of the first embodiment. In a case where the temperature transfer path from the coolant to the temperature sensor spreads out two-dimensionally, as in the second embodiment, on the other hand, it may be preferable to approximate the transfer function by a second order lag system rather than a simple first order lag system. A condition in which the coolant flow passage is rectangular on an orthogonal cross-section to the coolant flow and the temperature sensor is positioned on the outer side of the flow passage when seen from a direction of either one of two orthogonal sides of the rectangular cross-section of the flow passage, for example, may be cited as such a case. In other words, a condition in which the temperature sensor is positioned in a diagonally opposing quadrant to a quadrant of the flow passage that is defined by two straight lines obtained by extending the two orthogonal sides of the rectangular cross-section of the flow passage corresponds to such a case. In such a case, a closest point to the temperature sensor within the cross-section of the flow passage is an intersection between the two sides. When the heat transfer path from the intersection to the temperature sensor is modeled, a first order lag system that is dependent on a distance between the closest point and the temperature sensor as seen from one of the two sides is obtained, and a similar first order lag system (albeit with a different distance) is obtained from the other side. Hence, the transfer function of the heat transferred from the closest point to the temperature sensor is appropriately modeled as a product of the two first order lag systems, or in other words a second order lag system.

Specific embodiments of the invention were described in detail above, but these embodiments are merely examples, and the scope of the claims is not limited thereto. Techniques described in the claims include various amendments and modifications applied to the above embodiments. Technical elements described in the specification and illustrated in the drawings exhibit technical utility either singly or in various combinations, and are not limited to the combinations described in the claims at the time of filing. Furthermore, the techniques cited in the specification and illustrated in the drawings are capable of achieving a plurality of objects simultaneously, and possess technical utility by achieving any one of those objects.

What is claimed is:
1. A cooler comprising:
   a casing having a flow passage through which a liquid coolant passes;
   a temperature sensor that is attached to the casing so as not to contact the coolant directly, the temperature sensor is configured to measure a temperature of the casing at intervals of a predetermined sampling period; and
   an estimator controlled by a controller, the estimator being configured to estimate a coolant temperature from a measurement value of the temperature sensor, the estimator being configured to store a gain map for each flow rate of the coolant, the estimator being configured to specify a gain corresponding to a third difference from the gain map, the estimator being configured to output an estimated value of the coolant temperature, the estimated value being obtained by adding a value obtained by multiplying the third difference by the gain to a current measurement value of the temperature sensor, and the third difference being obtained by subtracting an immediately preceding measurement value from the current measurement value, wherein the gain is obtained by dividing a first difference by a second difference, the gain map is a map on which the second difference is associated with the gain, the first difference is obtained by subtracting a measurement value of the temperature sensor from an actual temperature of the coolant at sampling period intervals while varying temperature of the coolant in steps, the second difference is obtained by subtracting a second measurement value from a first measurement value, the second measurement value is measured in an immediately preceding sampling period from a sampling period of the first measurement value.

2. The cooler according to claim 1, wherein
the estimator is configured to specify the gain from the gain map in accordance with the third difference and whether the third difference exhibits an increasing tendency or a decreasing tendency, on a condition that two gains are associated with the third difference.

* * * * *